(12) United States Patent  
Engelbrecht et al.

(10) Patent No.: US 7,562,263 B1
(45) Date of Patent: Jul. 14, 2009

(54) SYSTEM AND METHOD FOR DETECTING AND RECOVERING FROM ERRORS IN A CONTROL STORE OF AN ELECTRONIC DATA PROCESSING SYSTEM

(75) Inventors: Kenneth L. Engelbrecht, Blaine, MN (US); Douglas A. Fuller, Eagan, MN (US); David C. Johnson, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 498 days.

(21) Appl. No.: 11/226,499

(22) Filed: Sep. 14, 2005

(51) Int. Cl.
*G01F 11/00* (2006.01)
(52) U.S. Cl. .............................. 714/49; 714/15; 714/718
(58) Field of Classification Search .................... 714/49
See application file for complete search history.

(56) References Cited

U.S. PATENT DOCUMENTS

| | | | |
|---|---|---|---|
| 4,044,337 A * | 8/1977 | Hicks et al. .................... 714/19 |
| 4,823,252 A | 4/1989 | Horst et al. |
| 5,109,381 A * | 4/1992 | Duxbury et al. ............... 714/49 |
| 5,150,469 A * | 9/1992 | Jouppi ......................... 712/244 |
| 5,212,693 A * | 5/1993 | Chao et al. ..................... 714/5 |
| 5,386,549 A * | 1/1995 | Norrie et al. ................... 714/15 |
| 5,511,164 A * | 4/1996 | Brunmeier et al. ............ 714/53 |
| 5,577,259 A | 11/1996 | Alferness et al. |
| 5,604,753 A | 2/1997 | Bauer et al. |
| 5,774,648 A | 6/1998 | Kao et al. |
| 5,794,071 A * | 8/1998 | Watanabe et al. ............. 710/27 |
| 5,870,601 A * | 2/1999 | Getzlaff et al. .............. 712/244 |
| 6,243,666 B1 | 6/2001 | Boone et al. |
| 6,446,224 B1 * | 9/2002 | Chang et al. ................... 714/54 |
| 6,457,119 B1 * | 9/2002 | Boggs et al. ................. 712/227 |
| 6,467,047 B1 * | 10/2002 | Scaringella et al. ............ 714/6 |
| 6,543,028 B1 | 4/2003 | Jamil et al. |
| 6,658,621 B1 | 12/2003 | Jamil et al. |
| 6,708,294 B1 | 3/2004 | Nakao et al. |
| 6,718,494 B1 * | 4/2004 | Jamil et al. .................. 714/723 |
| 2002/0082795 A1 * | 6/2002 | Quach ......................... 702/117 |
| 2002/0129339 A1 * | 9/2002 | Callahan et al. ............. 717/127 |
| 2004/0015627 A1 * | 1/2004 | Desoli et al. ................ 710/260 |
| 2004/0193992 A1 | 9/2004 | Jamil et al. |
| 2004/0205385 A1 | 10/2004 | Smith |

OTHER PUBLICATIONS

U.S. Appl. No. 10/278,559, "System and Method for Providing Uniform Control of a Pipeline Instruction Processor," 70 pages, filed Oct. 23, 2002.

(Continued)

*Primary Examiner*—Scott T Baderman
*Assistant Examiner*—Kamini Patel
(74) *Attorney, Agent, or Firm*—Brian Tufte; Charles A. Johnson; Robert P. Marley

(57) ABSTRACT

A system and method are provided for detecting and recovering from errors in a control store memory of an electronic data processing system. In some cases, errors in the control store memory are detected and recovered from without any required interaction with an operating system of the data processing system. Thus, errors in the control store memory can be handled seamlessly and efficiently, without requiring a maintenance technician, or in some cases, a specialized operating system routine, to help diagnose and fix the error.

25 Claims, 12 Drawing Sheets

OTHER PUBLICATIONS

U.S. Appl. No. 10/675,841, "System and Method for Detecting and Correcting Errors in a Control System," 41 pages, filed Sep. 30, 2003.

U.S. Appl. No. 11/180,435, "System and Method for Resolving Conflicts in an Instruction Pipeline," 51 pages, filed Sep. 13, 2005.

Rebaudengo et al., "An Accurate Analysis of the Effects of Soft Errors in the Instruction and Caches of a Pipelined Microprocessor," 6 pages, printed Mar. 18, 2005.

* cited by examiner

SYSTEM AND METHOD FOR DETECTING AND RECOVERING FROM ERRORS IN A CONTROL STORE OF AN ELECTRONIC DATA PROCESSING SYSTEM

CROSS REFERENCE TO CO-PENDING APPLICATIONS

The current application has some subject matter in common with co-pending, commonly assigned, U.S. patent application Ser. No. 11/180,435, filed Jul. 13, 2005, and entitled, "System and Method for Resolving Conflicts in an Instruction Pipeline", and further with co-pending, commonly assigned, U.S. patent application Ser. No. 11/226,803, filed on even date herewith, and entitled, "System and Method for Detecting and Recovering from Errors in an Instruction Stream of an Electronic Data Processing System".

TECHNICAL FIELD

This invention relates generally to handling errors within a digital system, and more particularly, to an improved system and method for handling errors occurring within a control store of an electronic data processing system.

BACKGROUND

Most general-purpose digital computers provide a system for detecting and handling single-bit or multiple-bit parity errors. The occurrence of soft errors is not uncommon when data signals are being read from storage devices such as static random access memories (SRAMs) and dynamic random access memories (DRAMs). This is especially true when high-density memories are employed, as is generally the case in large data processing systems.

In one example, the presence of alpha and other particles can cause soft parity errors in static random access memories (SRAMs) and dynamic random access memories (DRAMs). Alpha particles are randomly generated, positively charged nuclear particles originating from several sources, including cosmic rays that come from outer space and constantly bombard the earth, and from the decay of natural occurring radio-isotopes like Radon, Thorium, and Uranium. Concrete buildings, and lead based products such as solder, paint, ceramics, and some plastics are all well-known alpha emitters. Especially smaller geometry storage devices can be adversely affected by the emission of alpha and other particles, causing a higher occurrence of soft parity errors.

As discussed above, storage devices such as any type of RAM are susceptible to the types of error conditions discussed above. This includes control store RAMs of the type often employed to control logic sequencers within data processing systems. It is common, for example, to utilize one or more control store RAMs to control various logic sections of an instruction processor. For instance, consider an instruction decode circuit that is designed to decode an instruction opcode in preparation for instruction execution. The decode circuit may include a control store RAM that stores control signals that may be employed as decoded instruction signals. Specifically, the opcode may be presented as an address to a control store RAM. Data read from the control store RAM may then be used as the decoded instruction to control further instruction execution.

Using control store RAMs in the foregoing manner adds flexibility to a logic design. Control over the hardware can be altered by simply modifying the data stored within the RAMs. As is known in the art, this can be accomplished using a serial scan-set interface, for example. This may allow a logic designer to readily add unforeseen changes and/or correct design errors or oversights. However, as discussed above, these types of devices are often prone to parity errors.

One way to detect parity errors is through the use of parity bits, as is known in the art. In some cases, a detected error is reported to a maintenance processor, operating system, or other error-handling system, which in the case of a control store RAM, often results in a critical error that halts the execution of the data processing system, and often requires a maintenance technician, or in some cases, a specialized operating system routine, to help diagnose and fix the problem. This can bring the system down for some time, which can result in inefficient use of the data processing system resource. What is needed, therefore, is an improved system and method for detecting and then correcting errors in a control store RAM.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

A system and method are provided for detecting and recovering from errors in a control store memory of an electronic data processing system. In some cases, errors in the control store memory are detected and recovered from without any interaction with an operating system of the data processing system. Thus, and in many cases, errors in the control store memory can be handled seamlessly and efficiently, without requiring a maintenance technician, or in some cases, a specialized operating system routine, to help diagnose and fix the error.

In one illustrative embodiment, a control store is provided for controlling one or more operations of one or more instructions in a pipelined instruction processor. The control store may include a control store memory and, in some cases, a microcode engine coupled to the control store memory. A parity error detector can be provided for detecting parity errors in the control store memory, and in some cases, in the output data provided by the control store memory.

A maintenance block can be provided for reloading at least part of the control store memory when a parity error is detected in the control store memory. After the control store memory is reloaded, the instruction that corresponded to the detected parity error may be re-executed automatically. In some cases, the parity error is detected, the control store memory is reloaded, and the instruction that corresponded to the detected parity error is re-executed, without any interaction with the operating system of the pipelined instruction processor.

In some cases, if after a first parity error is detected, and the control store memory is reloaded, and the instruction that corresponded to the first detected parity error is re-executed, and then a subsequent parity error is detected for the same instruction, a critical error may be issued. The pipelined instruction processor may be halted and the operating system may be notified.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION

The present invention may be used in conjunction with many types of electronic data processing systems, and in particular, electronic data processing systems that use one or more control stores. However, for illustrative purposes, the present invention is described in detail with reference to a pipelined instruction processing system.

Figure 1:
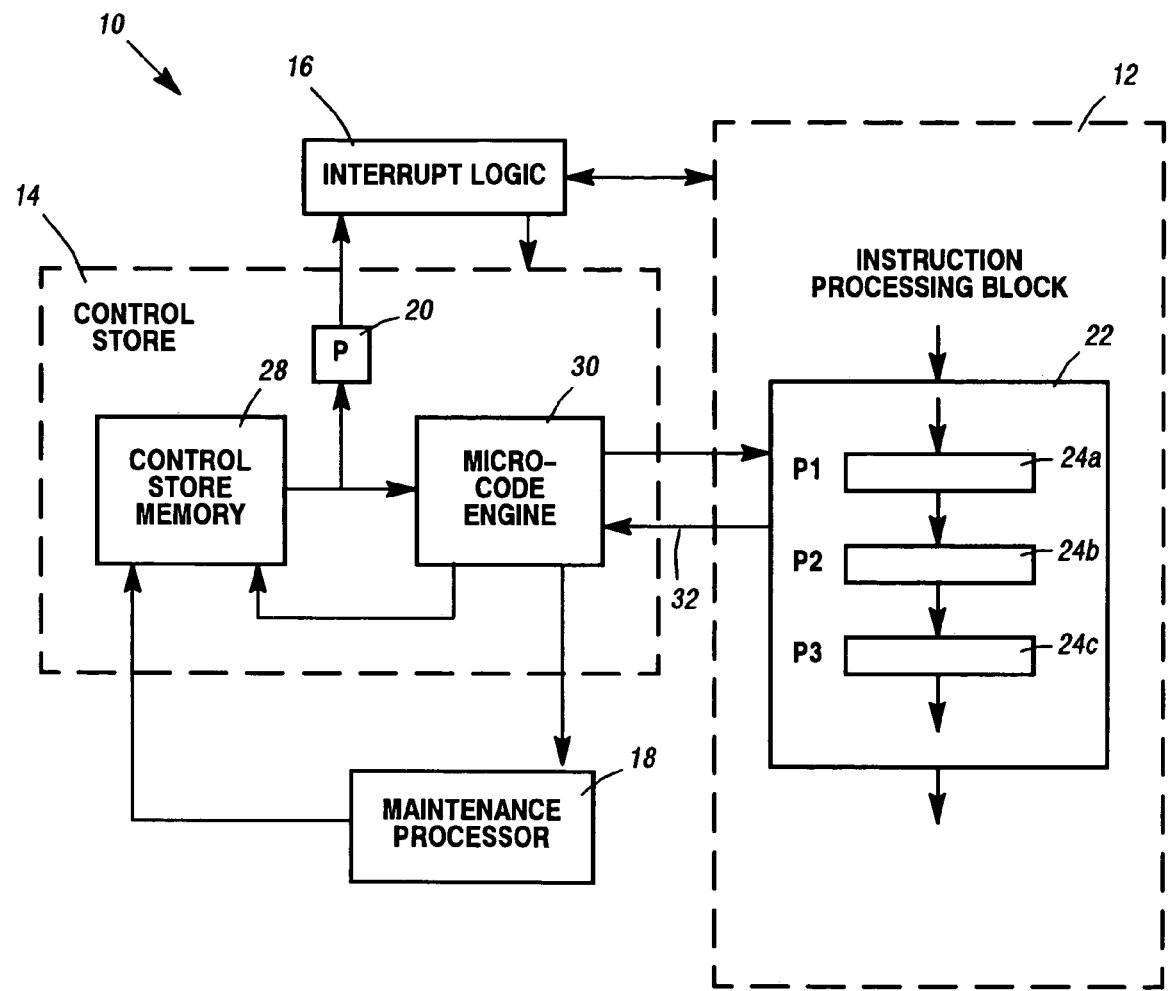
FIG. 1 is a schematic block diagram of an illustrative pipelined instruction processor in accordance with the present invention.

FIG. 1 is a schematic block diagram of an illustrative pipelined instruction processor in accordance with the present invention. The illustrative pipelined instruction processor is generally shown at 10, and includes an Instruction Processing Block 12, a Control Store 14, an Interrupt Handler 16, a Maintenance Processor 18, and a Parity Error Detector 20. The Instruction Processing Block 12 includes a Pipelined Instruction Processor Block 22 that has three Pipeline Stages 24a, 24b and 24c for processing instructions.

In the illustrative embodiment, the Instruction Processing Block 12 reads up and provides instructions to the Pipelined Instruction Processor Block 22. The Pipelined Instruction Processor Block 22 may be adapted to process or execute the instructions in a sequential fashion. Pipelined instruction execution is a method of increasing system throughput by dividing the execution of each instruction into functional operations that can be performed within different logic sections of the Instruction Processing Block 22. In some cases, each logic section of the Pipelined Instruction Processor Block 22 can be processing somewhat independently from the other logic sections. As such, the Pipelined Instruction Processor Block 22 can be executing portions of several instructions at one time so that instruction execution is overlapped.

For example, during a first pipeline cycle, a first instruction may be provided to the First Pipeline Stage 24a, where the First Pipeline Stage partially processed or executed the first instruction. During a second pipeline cycle, the first instruction is passed to the Second Pipeline Stage 24b, and a second instruction is provided to the First Pipeline Stage 24a. The Second Pipeline Stage 24b further processes or executes the first instruction, and the First Pipeline Stage 24a partially processes or executes the second instruction. During a third pipeline cycle, the first instruction is passed to the Third Pipeline Stage 24c, the second instruction is provided to the Second Pipeline Stage 24b, and a third instruction is provided to the First Pipeline Stage 24a. The Third Pipeline Stage 24c further processes or executes the first instruction, the Second Pipeline Stage 24b further processes or executes the second instruction, and the First Pipeline Stage 24a partially processes or executes the third instruction. Further instructions are provided in a like manner.

Some instructions, such as jump instructions, may cause a change in the sequence of instruction processing. The Instruction Processing Block 12 must then change the flow of instructions that are provided to the First Pipeline Stage 24a. In some cases, the change in sequence in instruction processing is not known until after one or more instructions from the original (sometimes predicted) sequence of instructions are already provided to the First Pipeline Stage 24a. For example, assume that the Third Pipeline Stage 24c in the illustrative Pipelined Instruction Processor 10 is where arithmetic type operations are performed. An instruction such as "Jump to instruction 100 if A>B" must proceed to the Third Pipeline Stage 24c before it is know whether A is greater than B, and thus whether a jump to instruction 100 is going to be taken. Meanwhile, two other instructions have already been provided to Pipeline Stages 24b and 24a. If the jump is to be taken (e.g. A is greater than B), then the instructions in Pipeline Stages 24a and 24b must be terminated, and the instruction 100 must be provided to the First Pipeline Stage 24a. Often, when this occurs, the Instruction Processing Block 12 may notify an Interrupt Handler 16 that aborts the execution of the instructions in Pipeline Stages 24a and 24b, and provides the correct instruction 100 to the First Pipeline Stage 24a. Aborting the execution of the instructions in Pipeline Stages 24a and 24b can be complex, as any state changes made by these instructions must typically be tracked and removed. A further discussion of controlling a Pipelined Instruction Processor 10 can be found in commonly assigned U.S. patent application Ser. No. 10/278,559, entitled "System and Method for Providing Uniform Control of a Pipelined Instruction Processor", which is incorporated herein by reference.

As noted above, the illustrative Pipelined Instruction Processor 10 may also include a Control Store 14. The illustrative Control Store 14 includes a Control Store Memory 28 and a Microcode Engine 30. The Microcode Engine 30 may receive signals from the Instruction Processing Block 12, and in some cases, the Pipelined Instruction Processor Block 22, via interface 32. The signals on interface 32 may indicate, among other things, which instructions are currently in or are being provided to the Pipelined Instruction Processor Block 22. The Control Store Memory 28 may then provide control signals to the Instruction Processing Block 12 and/or the Pipelined Instruction Processor Block 22 to help control the execution of the instructions. In some cases, the Microcode Engine 30 may not be provided, and the Control Store Memory 28 may function as, for example, a look up table to provide the control signals to the Instruction Processing Block 12 and/or the Pipelined Instruction Processor Block 22 to help control the execution of the instructions.

For instance, consider an instruction decode circuit that is designed to decode an instruction opcode in preparation for instruction execution. The Control Store Memory 28 that stores control signals may be employed as decoded instruction signals. Specifically, the opcode may be presented as an address to a Control Store Memory 28 from the Microcode Engine 30. Data read from the Control Store Memory 28 may then be used by the decoded instruction to control further instruction execution. In some cases, some of the signals read from the Control Store Memory 28 are provided back to the Microcode Engine 30, particularly for some types of instructions, to help keep track of the current state of the Instruction Processing Block 12 and/or the Pipelined Instruction Processor Block 22.

Using Control Store Memory 28 in the foregoing manner adds flexibility to a logic design. Control over the hardware can be altered by simply modifying the data stored within the Control Store Memory 28. This can be accomplished using, for example, a serial scan-set interface. This may allow a logic designer to readily add unforeseen changes and/or correct design errors or oversights. However, as discussed above, these types of devices are often prone to soft errors.

In the illustrative embodiment, the Parity Error Detector 20 may monitor the output of the Control Store Memory 28, and report any parity errors to the Interrupt Handler 16. The Interrupt Handler 16 may be a logic block that may interrupt the execution of the Instruction Processing Block 12 and/or the Pipelined Instruction Processing Block 22 when a parity error is detected. In some cases, the Interrupt Handler 16 may also notify the Microcode Engine 30 of the parity error. In response, and in one illustrative embodiment, the Microcode Engine 30 may notify the Maintenance Processor 18, which then reloads at least part of the Control Store Memory 28, and in some cases, the entire Control Store Memory 28. In other embodiments, the Interrupt Handler 16 may notify the Maintenance Processor 18 directly of any detected parity error, if desired.

After the Control Store Memory 28 is reloaded, the instruction or instructions in the Instruction Processing Block 12 and/or the Pipelined Instruction Processing Block 22 that corresponded to the detected parity error may be re-executed automatically. In some cases, the parity error is detected, the Control Store Memory 28 is reloaded, and the instruction that corresponded to the detected parity error is re-executed, without any interaction with the operating system of the pipelined instruction processor.

That is, in the illustrative embodiment, the Parity Error Detector 20, Control Store 14, Interrupt Handler 16, Maintenance Processor 18 and Instruction Processing Block 12 may cooperate together to automatically detect a parity error in the Control Store Memory 28, halt the instruction processing in the Instruction Processing Block 12, abort the execution of selected instructions in pipeline stages, and re-execute the instruction or instructions that were affected by the parity error, sometimes without any interaction with the operating system of the Pipelined Instruction Processor 10. The halting and re-queuing of the affected instructions may be accomplished using the methods and systems described in, for example, U.S. patent application Ser. No. 10/278,559, entitled "System and Method for Providing Uniform Control of a Pipelined Instruction Processor", which is incorporated herein by reference. Thus, and in many cases, errors in the Control Store Memory 28 can be handled seamlessly and efficiently, without requiring a maintenance technician, or in some cases, a specialized operating system routine, to help diagnose and fix the error.

In some cases, if parity errors are again detected in the Control Store 14 when the affected instruction or instructions are re-executed, a more serious problem may be indicated, and a critical error may be issued. In response, the Instruction Processing Block 12 may be halted and the operating system may be notified.

Figure 2:
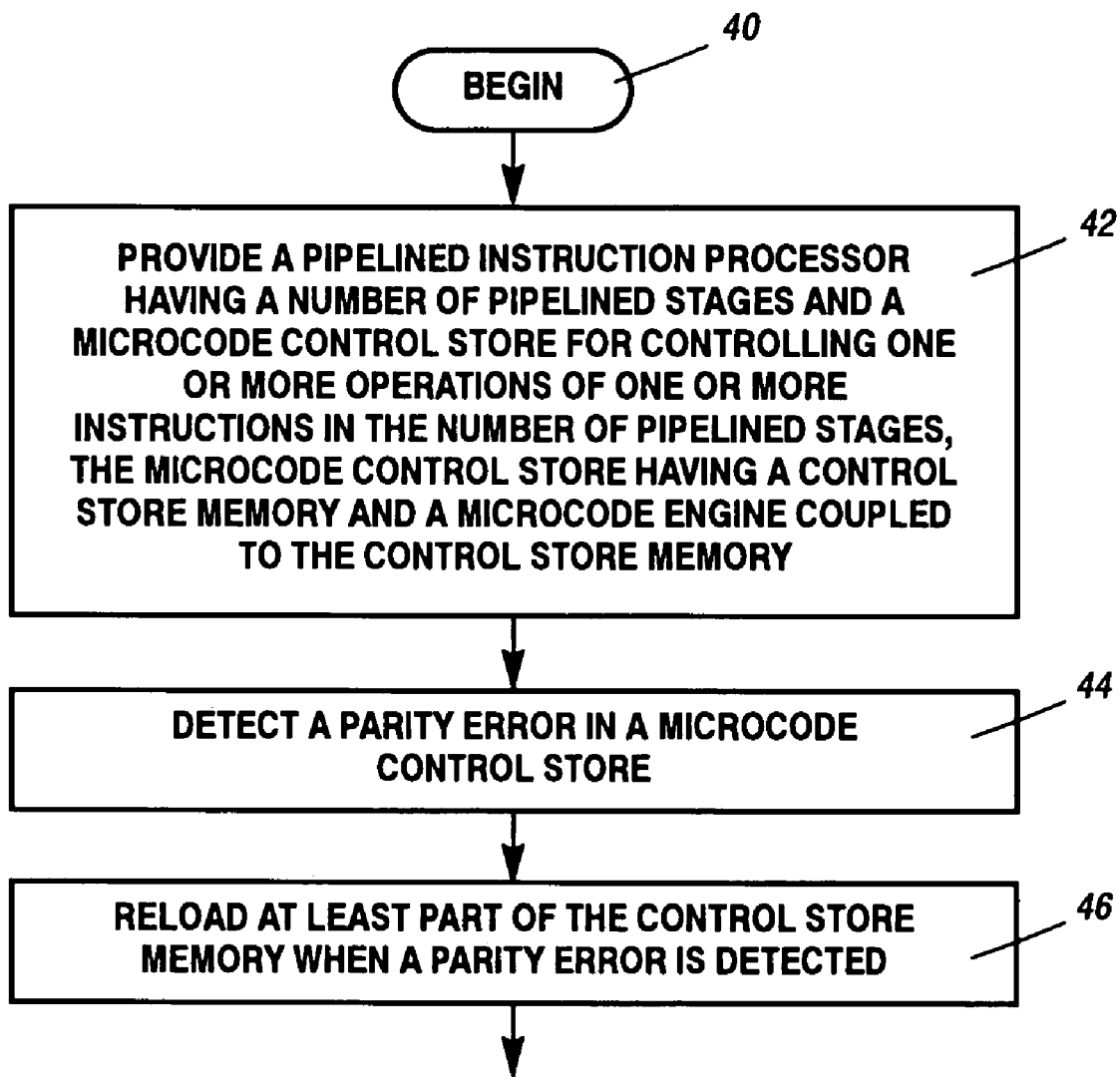
FIG. 2 is a flow diagram of an illustrative method of the present invention.

FIG. 2 is a flow diagram of an illustrative method of the present invention. The illustrative method is entered at step 40, and control is passed to step 42. Step 42 provides a pipelined instruction processor that has a number of pipelined stages and a control store for controlling one or more operations of one or more instructions in the number of pipelined stages. The illustrative control store includes a control store memory and a microcode engine coupled to the control store memory. Control is then passed to step 44. Step 44 detects a parity error in the control store. Control is then passed to step 46. Step 46 reloads at least part of the control store memory when a parity error is detected.

Figure 3:
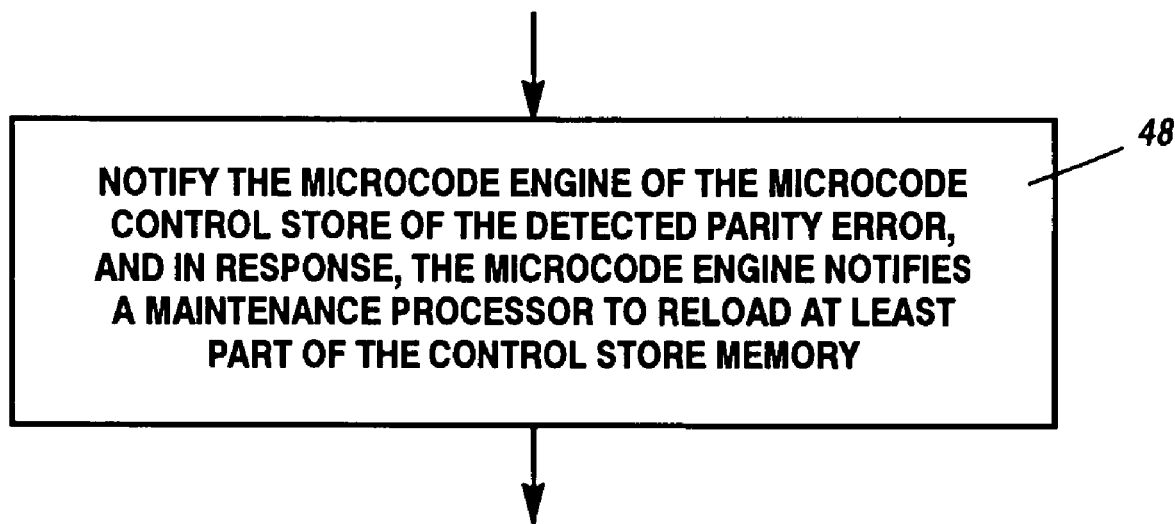
FIG. 3 is a flow diagram of an illustrative more detailed method for the reload step of FIG. 2.

FIG. 3 is a flow diagram of an illustrative more detailed method for the reload step 46 of FIG. 2. In FIG. 3, the illustrative more detailed method step is labeled 48, and includes the steps of notifying the microcode engine of the control store of the detected parity error, and in response, the microcode engine notifies a maintenance processor to reload at least part of the control store memory.

Figure 4:
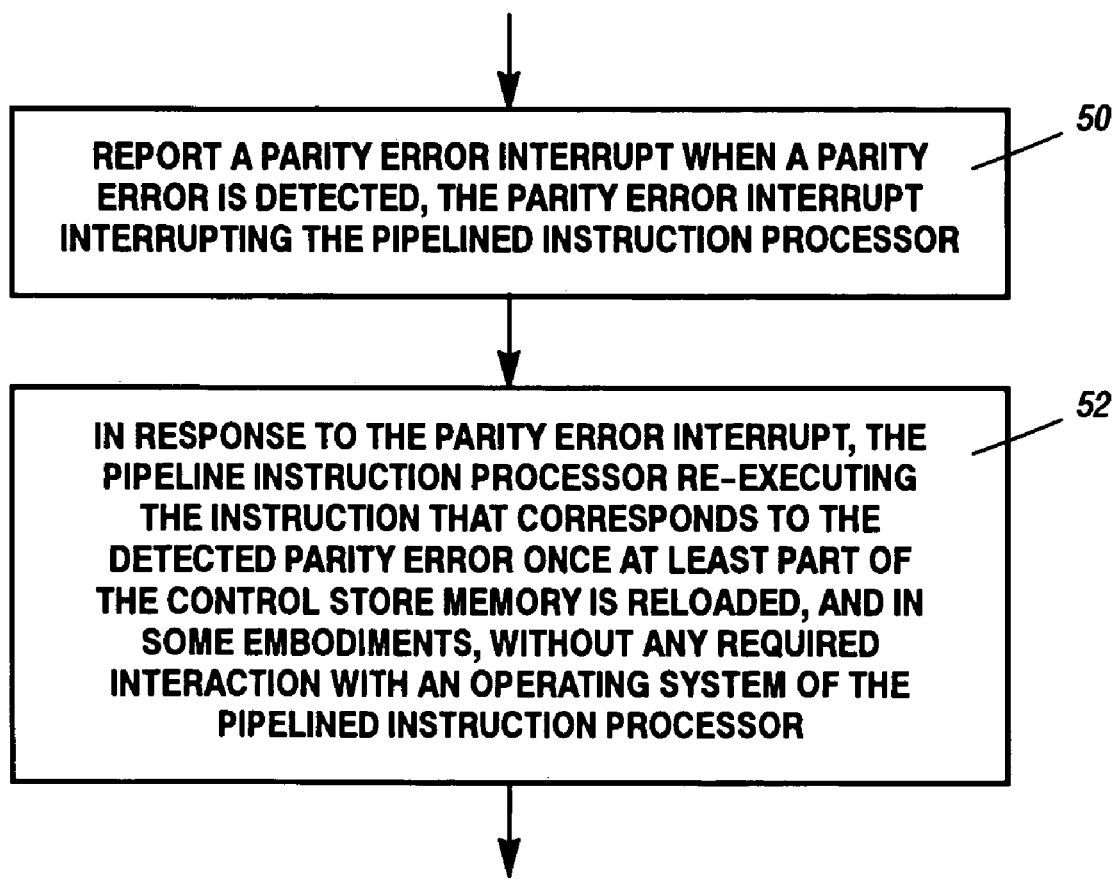
FIG. 4 is a flow diagram of an illustrative method that may cooperate with the method of FIG. 2.

FIG. 4 is a flow diagram of an illustrative method that may cooperate with the method of FIG. 2. The illustrative method of FIG. 4 occurs after a parity error is detected at step 44 of FIG. 2. Step 50 reports a parity error interrupt when a parity error is detected, and the parity error interrupt interrupts the execution of instructions in the pipelined instruction processor. In response to the parity error interrupt, and as shown at step 52, the pipeline instruction processor re-executes the instruction(s) that corresponded to the detected parity error once the at least part of the control store memory is reloaded, and in some embodiments, without any required interaction with an operating system of the pipelined instruction processor.

Figure 5:
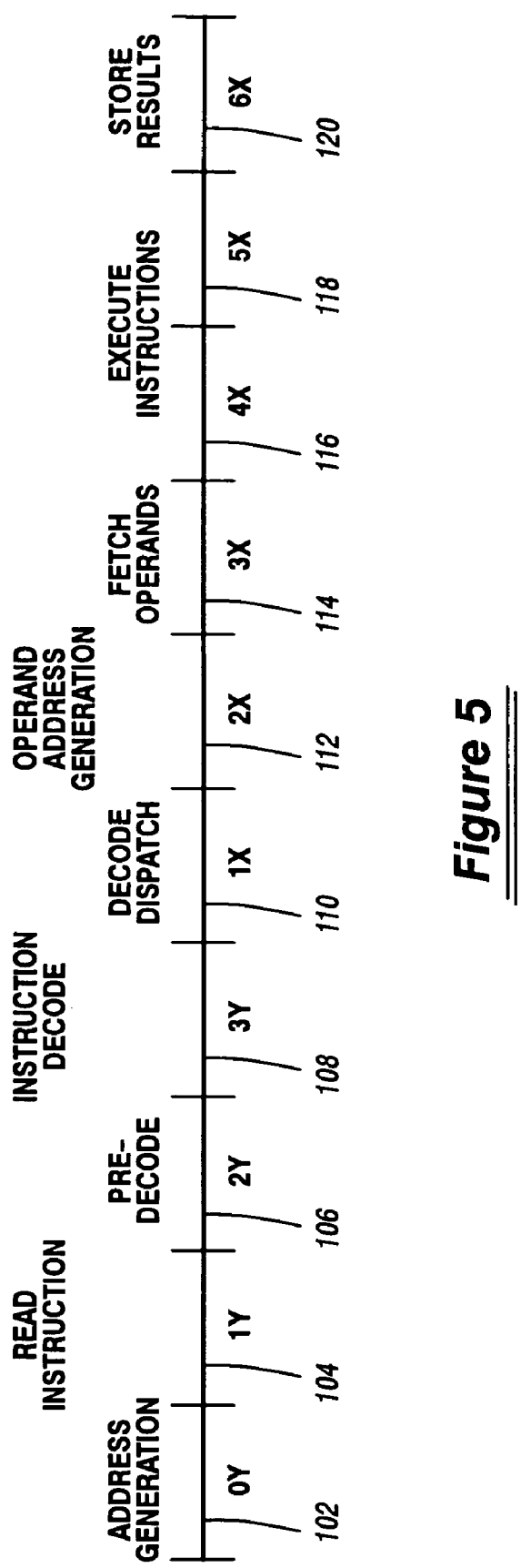
FIG. 5 is a timing diagram showing pipelined execution of an instruction by an illustrative Instruction Processor (IP)

Another illustrative embodiment of the present invention is shown and described with reference to FIGS. 5-12. FIG. 5 is a timing diagram showing pipelined execution of an instruction by an illustrative pipelined Instruction Processor (IP). As described briefly above, pipelined instruction execution is a method of increasing system throughput by dividing the execution of each instruction into functional operations that can be performed within different logic sections of the IP. Since each logic section of the IP can be processing somewhat independently from the other logic sections, the IP can be executing portions of several instructions at one time so that instruction execution is overlapped.

The timing diagram of FIG. 5 shows a standard instruction being divided into ten functional operations. Each of these functional operations may be referred to as a stage of execution. For the illustrative instruction processor, during the first stage, designated "0Y" stage labeled 102, address generation occurs for the instruction. Next, the instruction is retrieved from an instruction cache memory during the "1Y" stage, labeled 104. Following instruction retrieval, decode of the instruction begins during the pre-decode stage shown as "2Y" stage and labeled 106. Instruction decode continues during "3Y" stage labeled 108. During "1X" stage, labeled 110, the decoded instruction signals are dispatched to the various logic sections of the IP that perform instruction execution. The "2X" stage, which is labeled 112, is utilized primarily to generate any operand address that is required for instruction execution. During the "3X" stage, which is labeled 114, the operand address is used to fetch the operand from an operand cache memory. The "4X" and "5X" stages, labeled 116 and 118, respectively, are generally devoted to executing the operations specified by the decoded instruction, and the "6X" stage labeled 120 is used to store any results from the instruction execution.

In the pipeline architecture represented by the timeline of FIG. 5, 0Y, 1Y, 2Y, and 3Y stages may be considered "instruction fetch and pre-decode" stages, and the actual instruction execution may occur during the 1X through 6X stages. Since in this example, six standard instructions may be executing simultaneously during the 1X through 6X stages, the illustrated pipeline architecture is said to represent a six-deep instruction pipeline. That is, while a first instruction undergoes decode dispatch during the 1X stage, operand address generation occurs for a second instruction during the 2X stage. At the same time, operands for a third instruction are being retrieved, execution is occurring for fourth and fifth instructions, and any results produced by instruction execution are being stored for a sixth instruction.

Figure 6:
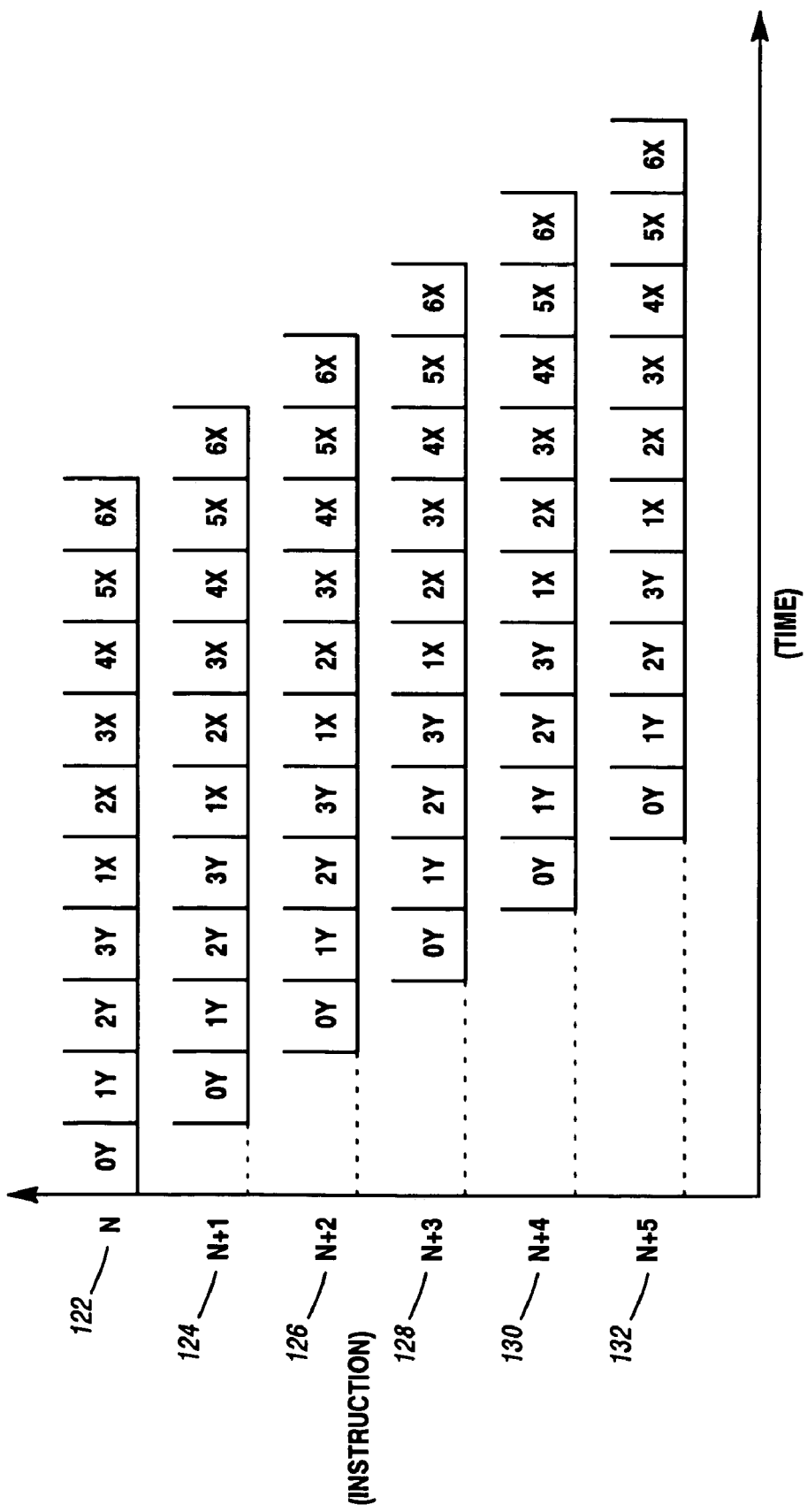
FIG. 6 is a timing diagram illustrating the pipeline instruction overlap of six consecutive standard instructions, N through N+5, in an instruction pipeline having the stages shown in FIG. 5.

FIG. 6 is a timing diagram illustrating the pipeline instruction overlap of six consecutive standard instructions N through N+5 in an instruction pipeline having the stages shown in FIG. 5. Waveforms representing execution of these six instructions are labeled 122, 124, 126, 128, 130, and 132 respectively. The diagram represents fully overlapped execution for the four stages of instruction fetch and pre-decode, 0Y through 3Y, and the six stages of instruction execution, 1X through 6X. When instruction execution is "fully overlapped", one instruction completes every stage. In one embodiment, each pipeline stage is one cycle of the system clock in length. In fully overlapped mode, each instruction that is not yet complete advances to a next stage of the pipeline at the start of a new clock cycle.

Figure 7:
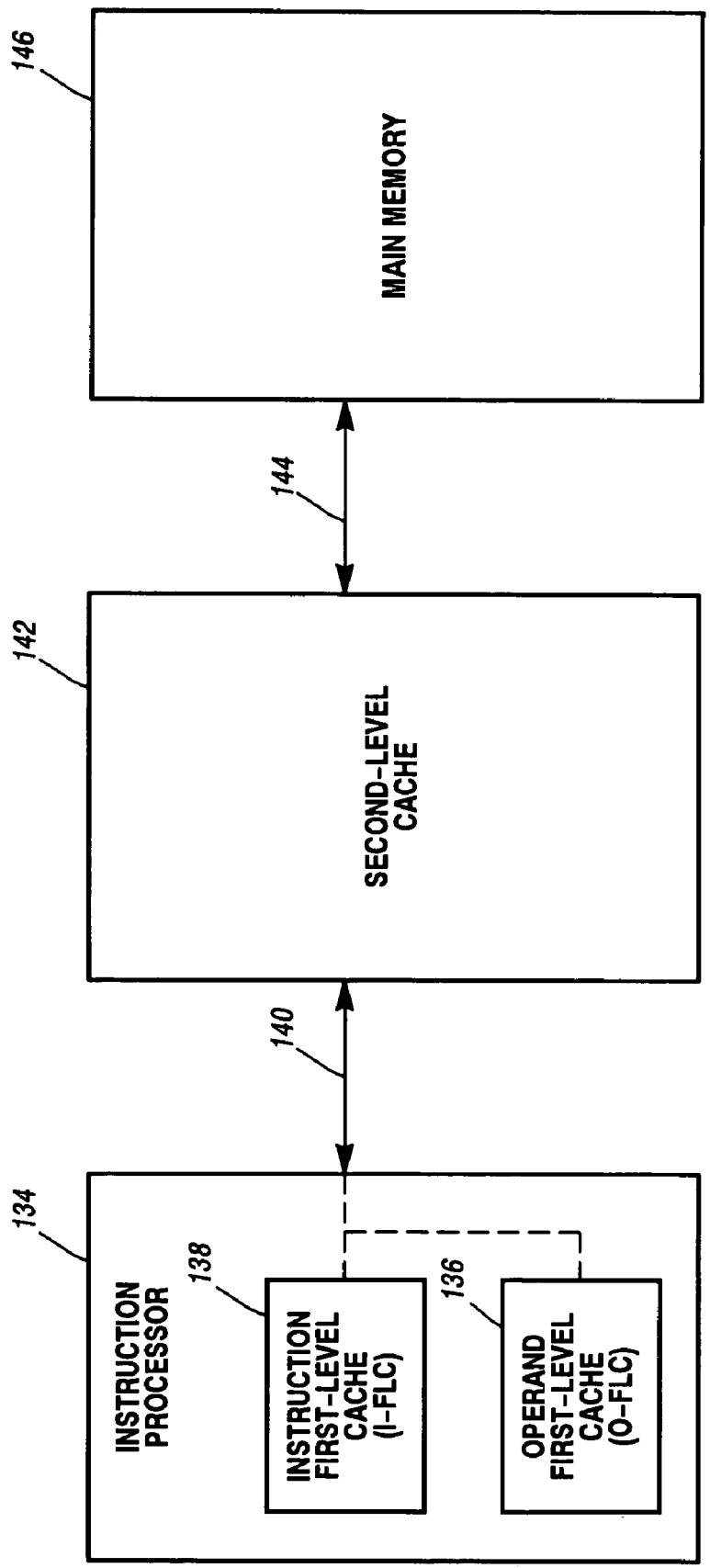
FIG. 7 illustrates the system environment of one embodiment of the current invention.

FIG. 7 illustrates the system environment of one illustrative embodiment of the present invention. The illustrative Instruction Processor (IP) 134 includes both an Operand First-Level Cache (O-FLC) 136 and an Instruction First-Level Cache (I-FLC) 138. The O-FLC 136 and I-FLC 138 are relatively small, fast, memories for storing recently-used operands and instructions, respectively, in a manner known in the art, to speed instruction execution within the IP 134.

I-FLC 138 and O-FLC 136 are coupled via Interface 140 to a Second-Level Cache (SLC) 142 storing both instructions and operands. Requests for instructions or operands are made to the SLC when the instructions or operands are not located within the I-FLC 138 or the O-FLC 136, respectively. Similarly, the SLC 142 is coupled via Memory Interface 144 to additional storage shown as Memory 146. When a request is made to the SLC for an item not stored in the SLC, the request is forwarded to Memory 146 for processing. In one embodiment, Memory 146 includes both a third-level cache and a main storage unit. The implementation details of Memory 146 are beyond the scope of this application.

Figure 8:
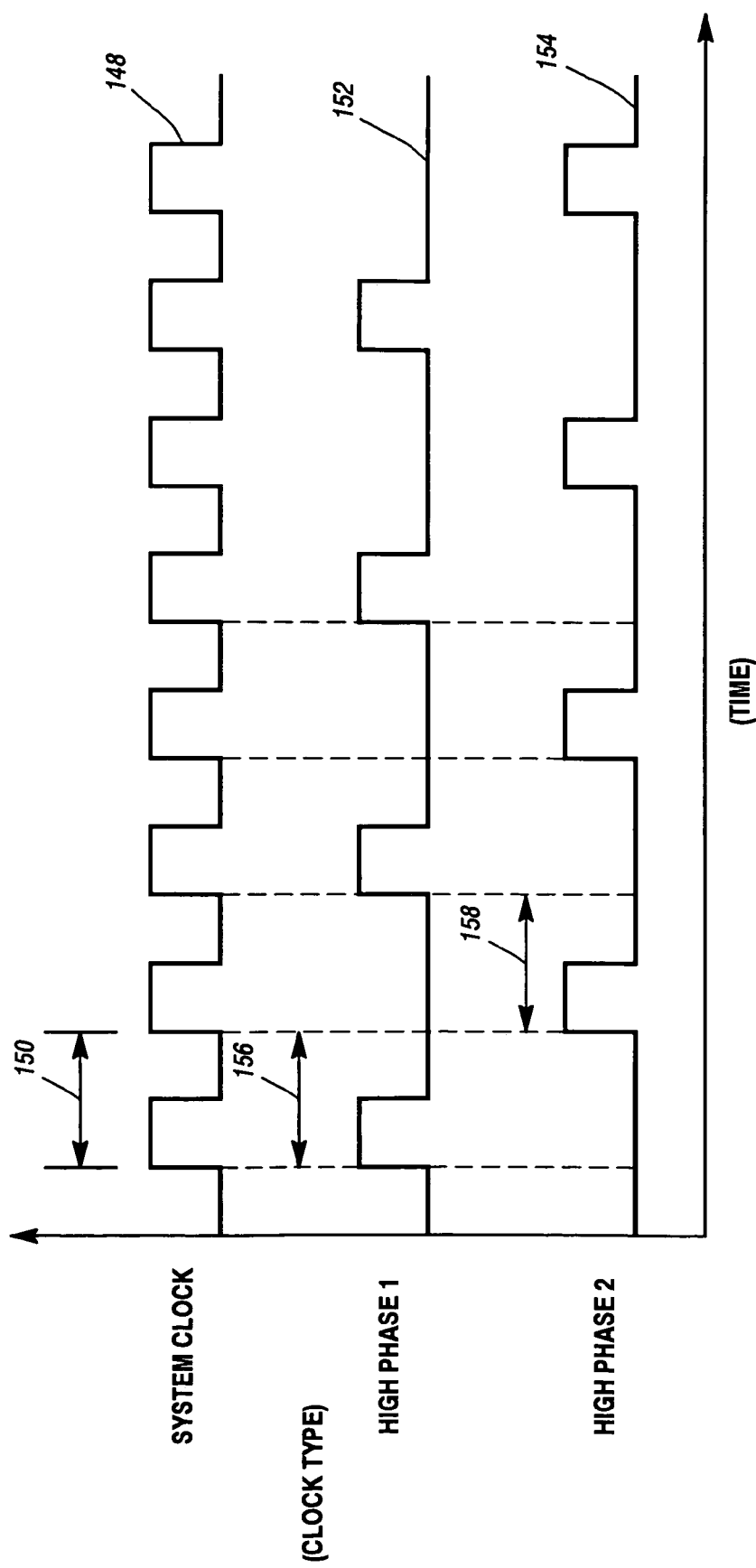
FIG. 8 is a timing diagram illustrating the clock signals associated with the IP logic of the preferred embodiment.

FIG. 8 is a timing diagram illustrating the clock signals associated with the IP logic of one illustrative embodiment of the present invention. The system clock shown in waveform 148 has a predetermined clock period 150. This system clock is used to generate all other clock signals in the system using a clock-generation scheme that is well-known in the art. Two of the clock signals used within the IP logic are represented by waveforms High Phase 1, labeled 152, and High Phase 2, labeled 154. The system clock periods associated with the high clock pulse of High Phase 1 and High Phase 2 can be referred to as Phase 1, labeled 156, and Phase 2, labeled 158, clock periods, respectively.

Figure 9:
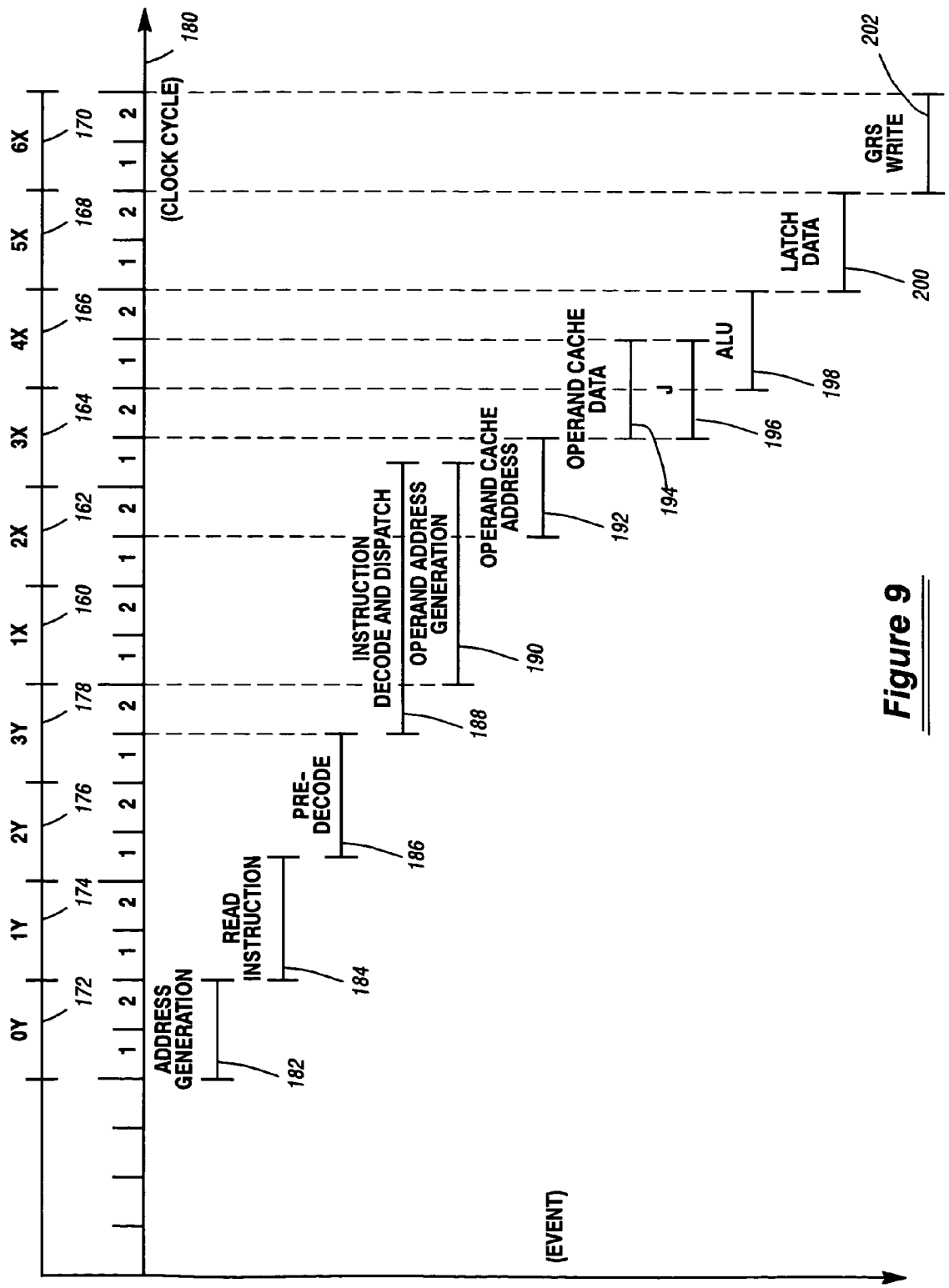
FIG. 9 is a timing sequence diagram illustrating the sequencing of a standard instruction through the instruction pipeline of the preferred embodiment.

FIG. 9 is a timing sequence diagram illustrating the sequencing of a standard instruction through the instruction pipeline of the illustrative embodiment of the present invention. The six stages of execution, designated stages 1X through 6X described above, are labeled stages 160, 162, 164, 166, 168, and 170, respectively. The four additional instruction fetch and pre-decode stages 0Y through 3Y are label 172, 174, 176, and 178, respectively. Each of these stages is shown to have both a Phase 1 and a Phase 2 cycle, as is illustrated on line 180. Hereinafter, a phase within one of the stages is referenced by indicating the stage following by the phase. For example, phase 1 of stage 1X is referred to as "1X1".

As mentioned above, and as illustrated by line 182, address generation for an instruction occurs in the 0Y stage. This address is used to fetch the instruction from memory. In most situations, when the addressed instruction is located in the I-FLC 138, the instruction is read from the I-FLC 138 during the 1Y stage, as shown by line 184. The instruction is provided to pre-decode logic that begins the instruction decode process in the 2Y stage, as illustrated by line 186. Instruction decode continues during the 3Y stage, and decoded instruction signals are provided to various logic sections of the IP during the 1X stage. This is illustrated by line 188.

Additionally, operand address generation begins during the 1X stage for any operands required by the instruction as displayed by line 190. By 2X2, the operand cache address is available for presentation to the O-FLC 136 as shown on line 192. At time 3X2, data from the O-FLC 136 is available as illustrated by line 194. Line 196 represents "per J shifting", which is an operation performed to select partial or full word operands as specified by the instruction.

At time 4X1, the Arithmetic Logic Unit (ALU) receives any fetched operand to be processed by the instruction, and may also receive operand data retrieved from one of the registers included within an internal IP register set called the General Register Set (GRS). The ALU processes the data during the 4X stage, and the results are latched during the 5X stage. This is shown by lines 198 and 200, respectively. Finally, data is written back to the GRS during the 6X stage, as displayed by line 202.

The timing sequence discussed above is a general illustration of the manner in which an instruction moves through the illustrative instruction pipeline. The above discussion assumes that a "standard" (that is, a "non-extended") instruction is being executed, and that the instruction requires some ALU processing to occur. It will be remembered that instruction sequences vary depending on the type of instruction being executed, and the functions and timing associated with the hardware sequences will therefore also vary somewhat. The above discussion also assumes the addressed instruction and required operands are available in the I-FLC 138 and O-FLC 136, respectively. If this is not the case, processing delays may result, since one or more instructions and/or operands must be retrieved from Memory 146.

As mentioned above, FIG. 9 illustrates the execution of a "standard" (non-extended) instruction. This means that no additional microcode processing is necessary to complete execution of the instruction. Other instructions require that instruction execution be at least partially carried out under the control of a Micro Sequencer within the IP. This Micro Sequencer executes IP microcode that controls the various logic sections of the IP. When this type of execution is required, additional "extended-mode" stages must be inserted into the instruction processing time-line. This increases the time required for an instruction to complete execution, and also suspends the overlap of instruction execution within the IP pipeline.

Figure 10:
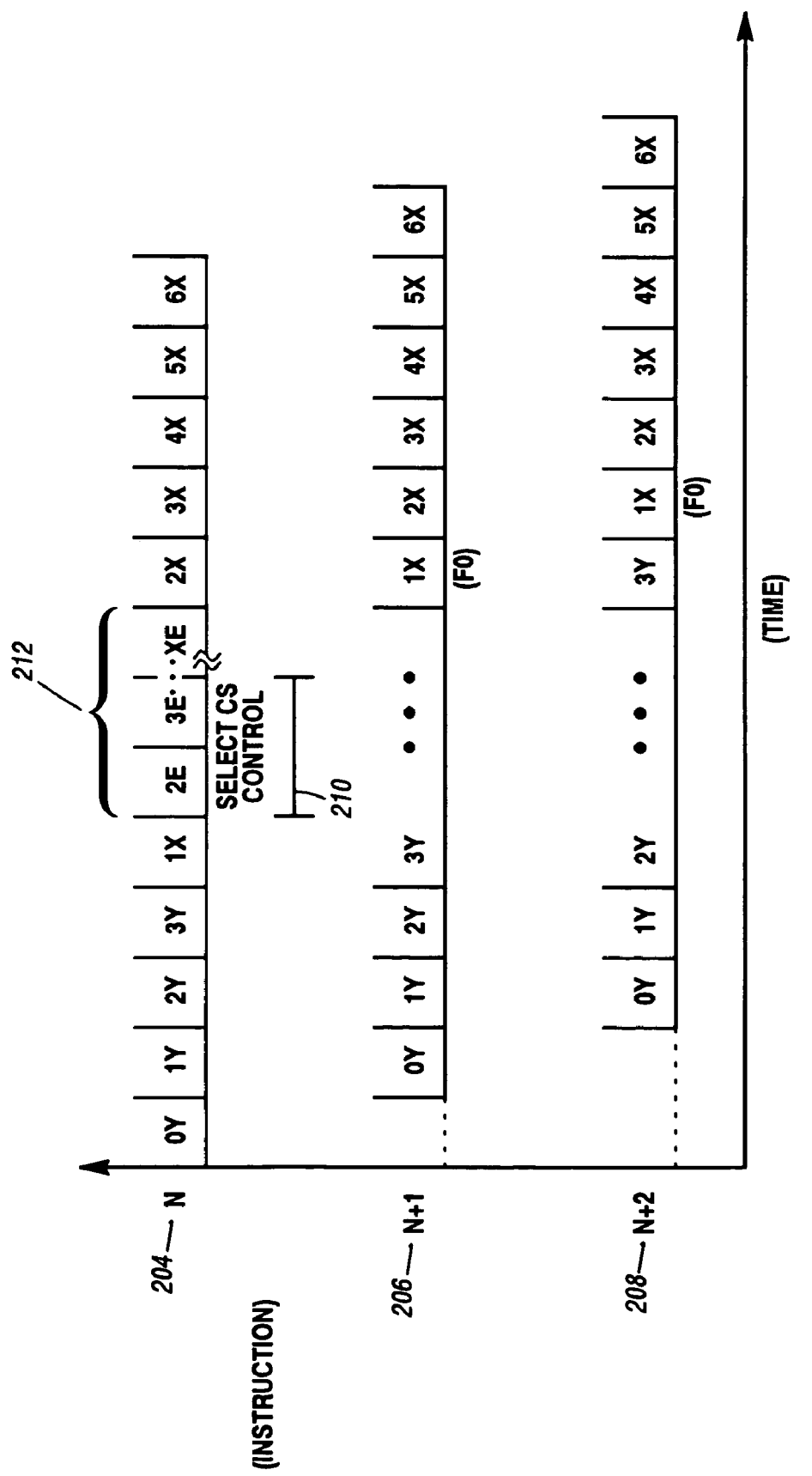
FIG. 10 is a timing diagram illustrating the suspension of instruction execution within the pipeline when an extended-cycle instruction is executed.

FIG. 10 is a timing diagram illustrating the suspension of instruction execution within the pipeline when an extended-cycle instruction is executed. Three consecutive instructions N 204, N+1 206, and N+2 208 are shown. Instruction N 204 is the extended-cycle, or "extended-mode", instruction. During execution of an extended-mode instruction, a control signal called "Select CS Control" is activated during phase 2 of stage 1X, as indicated by line 210. The activation of Select CS Control prevents the decoded instruction signals for instruction N+1 206 from being dispatched to the various IP logic sections during stage 1X of instruction N+1. This allows execution to continue under microcode control on the Nth instruction for a variable number of additional cycles 212. These additional cycles are illustratively shown as 2E, 3E, and 4E, but more or fewer extended cycles could occur. The Select CS Control signal remains active until the beginning of the last additional cycle, as shown by line 210. After the Select CS Control signal is deactivated, the next instruction N+1 206 can be loaded for decode and normal pipeline execution is resumed.

Figure 11:
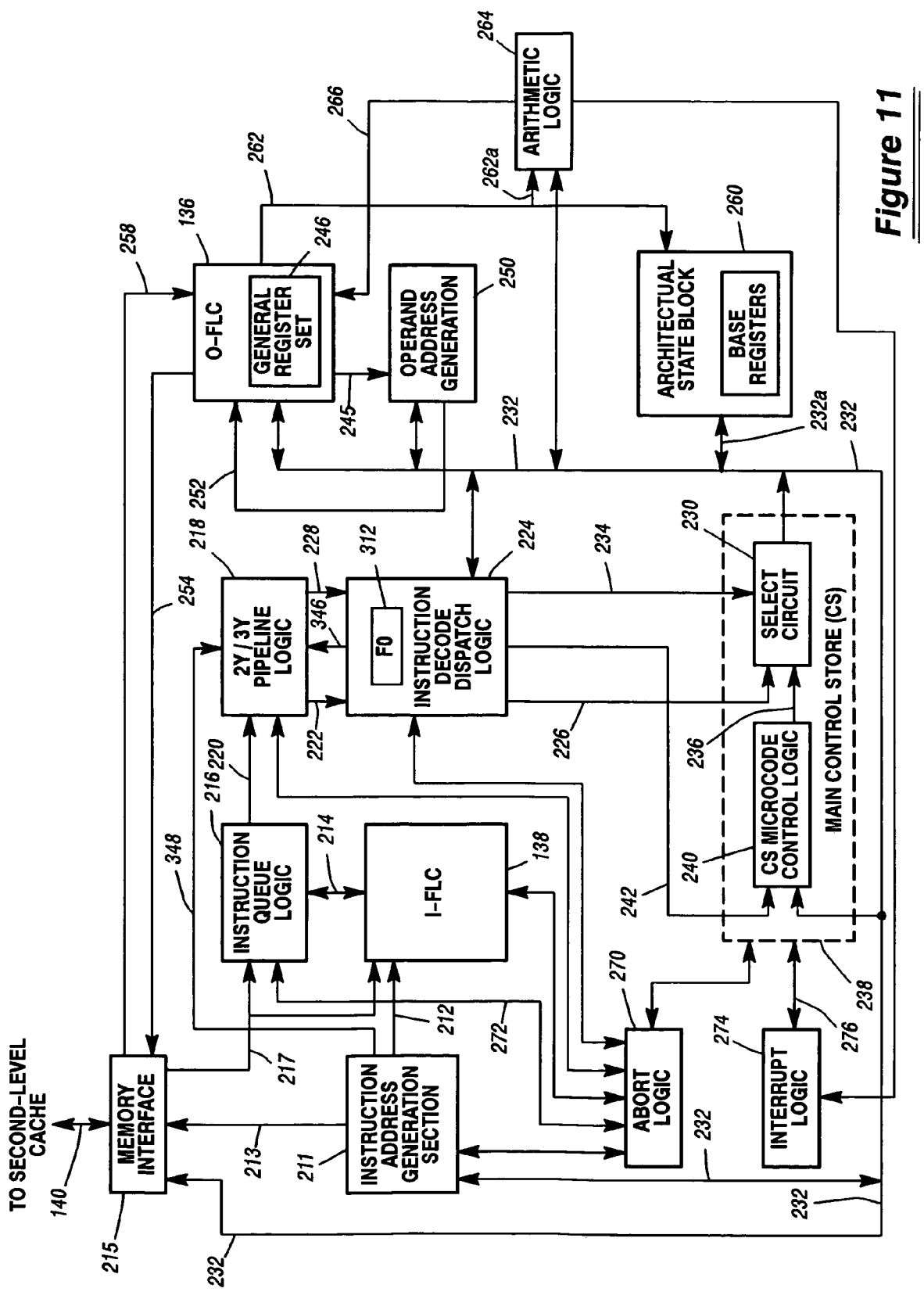
FIG. 11 is a block diagram of the major sections of an Instruction Processor of the preferred embodiment.

FIG. 11 is a block diagram of the major sections of one embodiment of Instruction Processor (IP) 134. Although this diagram does not provide a complete view of all data, address, and control paths, a subset of these paths is shown to facilitate an understanding of how the various IP sections interact.

The IP includes an Instruction Address Generation Section 211 that provides logic that generates an absolute instruction address by adding a relative address to the address of a designated base register within the IP. The absolute instruction address is provided to a tag memory (not shown in FIG. 11) to determine if the addressed instruction is located in the I-FLC 138. If the instruction is resident in the I-FLC 138, the address is provided on line 212 to the I-FLC so that the addressed instruction may be retrieved and provided on line 214 to the Instruction Queue Logic 216. If the address is not resident in the I-FLC, the address is provided on line 213 to Memory Interface 215, which forwards the address on line 140 to the Second-Level Cache 142 (FIG. 7). When the instruction becomes available, it is provided to the I-FLC and forwarded to the Instruction Queue Logic 216 on line 217.

In general, an instruction is stored in Instruction Queue Logic 216 prior to entering the 2Y and 3Y stages of the pipeline. Instruction Queue Logic 216 includes a storage device that stores a predetermined number of instructions, which in some cases, may be eight. A next instruction may be selected from the Instruction Queue Logic 216 by providing an address to the Instruction Queue Logic 216. If the Instruction Queue Logic 216 does not contain a desired instruction, the desired instruction is read from the I-FLC 138, and the instruction read from the I-FLC 138 is provided immediately to the pre-decode logic without first being stored in the Instruction Queue Logic 216.

Pre-decode and decode of an instruction during the 2Y and 3Y stages, respectively, are performed by the 2Y/3Y Pipeline Logic 218. This logic receives an instruction from the Instruction Queue Logic 216 via the interface shown as line 220. This logic performs the decode operations that generate the hardware signals to control instruction execution. The 2Y/3Y Pipeline Logic 218 will be discussed in more detail below.

2Y/3Y Pipeline Logic 218 provides hardware signals on line 222 to Instruction Decode Dispatch Logic 224 at time 1X1, which, in turn, forwards these signals to the rest of the IP on line 226. Additionally, 2Y/3Y Pipeline Logic provides the instruction on line 228 to Instruction Decode Dispatch Logic 224 so that this instruction can be stored, and further decode operations can be performed by Instruction Decode Dispatch Logic 224 to generate additional hardware control signals.

For standard instructions, the signals provided by Instruction Decode Dispatch Logic 224 via line 226 are selected by Select Circuit 230 to be provided to all parts of the IP on line 232. As discussed previously, these signals provide the hardware control sequences necessary to complete execution of the standard instruction. Selection of the signals on line 226 is controlled by the Select CS Control Signal on line 234 generated by the Instruction Decode Dispatch Logic 224. For non-standard, extended-mode instructions, the Select CS Control Signal instead selects signals on line 236 to be provided to the various IP logic sections. The signals on line 236 are generated by Main Control Store (CS) section 238.

Figure 12:
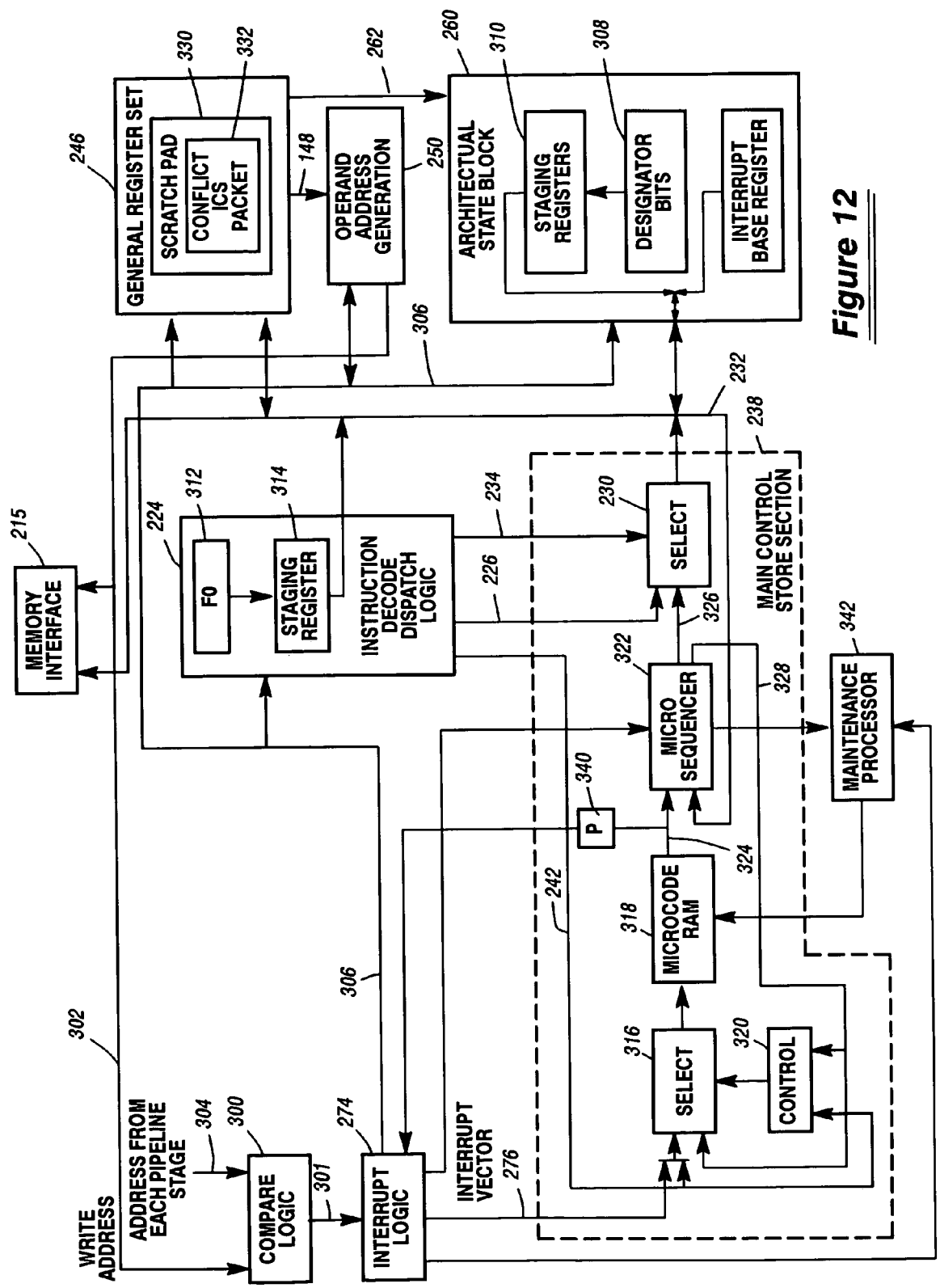
FIG. 12 is a logic block diagram of the Instruction Processor illustrating main control store logic in more detail.

Main Control Store Section 238 includes CS Microcode Control Logic 240, which is a microcode-controlled sequencer that is initially enabled by address and control signals provided on line 242 from Instruction Decode Dispatch Logic 224. The microcode-controlled sequencer executes microcode instructions stored within a control store memory device (not explicitly shown in FIG. 11, but which is shown in FIG. 12) embedded within the Main Control Store Section 238. The signals on line 236, which may be the output data from the control store memory, are selected by select circuit 230 to control IP execution during the extended execution cycles for non-standard instructions. For more information on microcode-controlled pipeline execution of extended-mode instructions, see U.S. Pat. No. 5,577,259 to Alferness et al. entitled "Cooperative Hardware and Microcode Control System for Pipelined Instruction Execution", assigned to the assignee of the current invention.

As stated previously, the control signals on line 232 are provided to all sections of the IP to control instruction execution. Some of these control signals are used to access the General Register Set (GRS) 246 to retrieve operand indexes, which are then provided over lines 245 to the Operand Address Generation Section 250. In response, the Operand Address Generation section 250 generates an operand absolute address, which is transferred to the Operand First-Level Cache (O-FLC) 136 on lines 252. After the absolute operand address has been received by the O-FLC 136, the O-FLC logic determines whether the addressed operand is resident in the O-FLC. If the operand is not resident, the IP suspends instruction execution and initiates a memory read over lines 254 to the Memory Interface 215. In response, Memory Interface initiates a request to the SLC 142 over Interface 140. After the operand is returned on Interface 140 to Memory Interface, the operand is provided to the O-FLC 136 on line 258.

If an O-FLC hit occurs, or after execution has resumed in the case of an operand cache miss, the operand data is available at 3X2 time (see FIG. 9). This data is provided to the Architectural State Block 260 over interface 262. Depending upon the instruction execution, this data may be used in conjunction with the addressing signals provided on line 232a to generate the next operand cache address.

Operand data is further made available over line 262a to the Arithmetic Logic 264 during the end of the 3X stage. The Arithmetic Logic 264 performs the multiply/divide, floating point, decimal and/or other arithmetic operations for the machine during the 4X stage. The results are stored back to GRS 246 over line 266 during the 6X stage.

The above description provides an overview of the manner in which control typically passes between the various IP logic sections of the illustrative IP during pipelined execution of an instruction. In some cases, this instruction execution is interrupted because of the detection of an error or some other occurrence that re-directs the flow of instruction execution. This type of situation is handled by Abort Logic 270.

Abort Logic 270 both receives, and provides, signals from/ to each of the other logic sections, including, but not limited to, Instruction Address Generation Section 211, Instruction Queue Logic 216, I-FLC 138, 2Y/3Y Pipeline Logic 218, Instruction Decode Dispatch Logic 224, and Main Control Store Logic 238. For ease of reference, interfaces between Abort Logic 270 and other logic sections are not shown. It will be understood, however, that Abort Logic 270 also receives signals from the remaining logic sections including O-FLC 136, Operation Address Generation Section 250, Arithmetic Logic 264, and Architectural State Block 260.

In general, Abort Logic 270 monitors the other logic sections for the occurrence of errors or other abnormal situations that will require that the flow of instructions through the pipeline be modified or halted. As an example, assume that an instruction is read from I-FLC 138 into Instruction Queue Logic 216 in preparation for execution. A parity error is detected on this instruction after that instruction is resident in the pipeline. In response, parity error detection circuitry included within Instruction Queue Logic 216 will send a signal to I-FLC 138 via interface 214 indicating that a parity error was detected on the fetch address, causing I-FLC to invalidate that data in cache.

In addition, Abort Logic 270 may also receive notification of the error from Instruction Queue Logic 216 on line 272. Abort Logic 270 will provide signals to Instruction Queue Logic 216 to cause the corrupted instruction to be discarded. Abort Logic 270 will also generate signals to Memory Interface 215 to cause an uncorrupted copy of the instruction to be retrieved from SLC 142 or Memory 146. In addition, since the instruction will not be available in time to begin decode within 2Y/3Y Pipeline Logic 218 at the time that decode would have otherwise taken place, Abort Logic 270 must generate signals that stop some of the instructions from advancing within the pipeline. That is, in some embodiments, Abort Logic 270 allows all instructions ahead of the corrupted instruction within the pipeline to continue to advance in a normal manner, but the remaining instructions are prevented from advancing until an uncorrupted copy of the instruction is available. The pipeline stages that empty during this time are put into a stalled state so that errors do not occur. When the instruction finally becomes available via Memory Interface 215, it is allowed to enter the pipeline so that normal processing resumes.

Another similar situation arises when a cache miss occurs to the I-FLC 138. When an instruction is unavailable within the I-FLC 138, Abort Logic 270 allows all instructions that have already entered the pipeline to continue to advance normally. As the initial pipeline stages empty because instructions are no longer available from I-FLC 138, Abort Logic 270 places these stages in a stalled state so errors do not occur. When the unavailable instruction is retrieved from either Second-Level Cache 142 or Memory 146, the instruction enters the pipeline so that overlapped instruction execution may resume.

Yet another type of situation that triggers Abort Logic 270 may be the detection within the pipeline of certain instruction combinations. For instance, when an instruction N is generating an operand that will be used by the next instruction N+1 within the instruction stream, the operand may not be available in time for use by instruction N+1. As an example, instruction N may be completing the storing of the operand within GRS 246 at the same time instruction N+1 is attempting to read that operand from these registers, leading to erroneous results. In one embodiment, Abort Logic 270 prevents an error from occurring by detecting the instruction combination, and then causing a "cycle slip" to occur. In other words, instead of following immediately behind instruction N in the pipeline, instruction N+1 will be two stages behind, with the stage between instructions N and N+1 being empty. This allows the operand to be generated by instruction N in time for its use by instruction N+1. If needed, multiple cycles may be slipped such that a predetermined number of stages of the pipeline are empty between instructions N and N+1.

Another approach to the foregoing problem involves providing special "wrap-back" paths that can be enabled when an instruction combination of the above-described type is detected. For example, a special data path may be provided to direct data from one of the registers of GRS 246 to a different register in an expedited manner that allows an instruction N+1 to use the data even if it is being generated by the previous instruction. This wrap-back path is enabled by Abort Logic 270 upon the detection of the instruction combination.

The examples discussed above are merely several of the many types of occurrences that can trigger the activation of Abort Logic 270 and the associated circuitry such as the wrap-back paths. As may be evident, Abort Logic 270 must include specialized logic not only to recognize each of the occurrences, but also to generate the appropriate logic sequences to handle each situation. In addition, each type of occurrence generally requires that the correct signals be transferred to, and from, Abort Logic 270 to the various other logic sections.

FIG. 11 also includes Interrupt Logic 274. Like Abort Logic 270, Interrupt Logic 274 receives signals from, and provides signals to, every logic section in the IP. Most of these signal interfaces are not shown in FIG. 11 for ease of reference. Interrupt Logic 274 generates an interrupt that is used to re-direct machine execution to a different address. For instance, the interrupt may cause the interruption of execution of the current instruction stream so that execution is re-directed to code that is part of the operating system. As an example, if a divide-by-zero operation is attempted, an interrupt signal from Arithmetic Logic 264 is provided to Interrupt Logic 274, which then saves the current state of the IP, and thereafter re-directs machine execution to special interrupt handling code that is part of the operating system. This interrupt handler is designed to address the situation that resulted in the interrupt. When execution of that special code is complete, the saved state of the machine is re-stored so that execution may continue with the original instruction stream. The hardware mechanism that is used to generate the interrupt is as follows. When Interrupt Logic 274 detects a signal from one of the other logic sections that indicates that an interrupt is to be generated, Interrupt Logic 274 provides a signal to other logic sections to cause these logic sections to store state information in local staging registers. For example, Instruction Decode Dispatch Logic 224 saves the state of the F0 register in a staging register of Instruction Decode Dispatch Logic. Recall that this register contains the instruction that is currently in stage 1X. Similar storage operations occur within other logic sections. For example, within Instruction Address Generation Section 211, the Program Address Register (PAR) is saved to a local staging register. This register stores the address of the instruction that will next be retrieved for entry into stage 0Y.

Other state information that is stored at this time includes designator bits such as extended addressing mode bits stored within Architectural State Block 260. These bits indicate whether the machine is running in an extended addressing or other mode. In general, all information needed to determine the operating environment of the IP is stored within various staging registers of the logic sections.

In addition to storing state information, the hardware sequences block updates that might be occurring to Memory 146 or to GRS 246 by the instruction that caused the interrupt, or any subsequent instructions within the instruction stream.

After hardware sequences that are generated by the Interrupt Logic 274 are used to store state information within each of the logic sections, Instruction Decode Dispatch Logic 224 activates the Select CS Control signal of FIG. 10. This signal, which is shown on line 234 of FIG. 11, causes Select Circuit 230 to begin selecting signals generated by CS Microcode Control Logic for presentation to the rest of the IP. In this manner, CS Microcode Control Logic 240 assumes control of the IP.

As discussed above, CS Microcode Control Logic 240 includes a control store memory (e.g. RAM) and a Micro Sequencer (not shown in FIG. 11, but which is shown in FIG. 12) for executing the microcode stored within the control store memory. The Micro Sequencer generates signals on lines 236 for presentation to the rest of the IP when the Select CS Control Signal is activated on line 234. CS Microcode Control Logic 240 begins executing standard interrupt processing code which transfers all of the saved state information from the staging registers of the various logic sections to Memory Interface 215 via signals lines that are not shown in FIG. 11 for ease of reference. The saved state information is written into an Interrupt Control Stack (ICS) in Memory 146 at a standard location known to the operating system, as determined by an address provided by the CS Microcode Control Logic to the Operation Address Generation Section 250.

After the hardware state has been temporarily stored within staging registers, the signals on line 232 generated by CS Microcode Control Logic 240 flush the stages of the pipeline that contain the instruction N and all following instructions in the instruction stream. All instructions that entered the pipeline before instruction N are allowed to complete normally. This places the pipeline in an initialization state so that it is ready to begin processing of a different instruction stream.

Next, the Micro Sequencer generates an operand address from the contents of an interrupt base register retrieved from Architectural State Block 260, and further from signals received from Interrupt Logic 274 on interface 276 that indicate the type of interrupt that occurred. The contents of this operand address are used as the new PAR. Instruction Address Generation Section 211 uses the new PAR as the address from which to retrieve the first instruction of an interrupt hander. Instruction Address Generation Section begins retrieving instructions from this address for entry into the pipeline. Execution of the designated interrupt handler is thereby initiated.

To summarize the foregoing, when interrupt processing is initiated, the state of the IP may be saved to main memory, and some of the instructions that had been in the pipeline are flushed in preparation to re-direct instruction execution, sometimes under the control of the operating system. After interrupt processing is completed, the state is restored so that execution may continue with the previous instruction stream. The saving of the IP state to memory, and the subsequent restoration of the state from memory, is perform via execution of the Interrupt Logic 274 operating in conjunction with CS Microcode Control logic 240, as will be discussed in more detail below.

In some cases, when the execution of one instruction within the pipeline may affect the execution of a subsequent instruction within the pipeline in a possibly unintended way, a conflict may exist. This can be best understood by considering an example conflict situation. Assume that a current stream of instructions is self-modifying such that an instruction N residing within stage 4X of the pipeline is changing instruction N+5 that follows instruction N in the instruction stream. That is, instruction N writes an updated instruction operation code (opcode) to Memory 146 to overwrite previous instruction N+5. When this updated instruction is stored to Memory 146, the old version of instruction N+5 has already entered the fetch stages of the pipeline. This old copy of the instruction that is resident within the pipeline is not overwritten by the normal logic that stores the updated instruction to Memory 146. The old version of instruction N+5 should not be allowed to enter Instruction Decode Dispatch Logic 224 to begin execution within stage 1X of the pipeline. The new version should be executed instead or unintended results will occur.

Special circuitry may be added to Abort Logic 270 to recognize the specific type of conflict situation involving self-modifying code that updates an instruction that is already resident in the pipeline. This special circuitry may be adapted to flush instruction N+5 from the pipeline, and insert the required number of cycle slips so that an updated copy of instruction N+5 can be retrieved either from a cache, or from Memory 146, depending on the memory implementation. When the updated copy of the instruction is available and resident within the pipeline, instruction execution can resume in the normal manner with the new instruction and the instructions that follow in the instruction sequence.

Another approach may use a special wrap path that provides the data that is being stored to Memory 146 directly to the affected pipeline stage. In this manner, the updated opcode is not only transferred to Memory 146, but is also stored directly to the register within the 2Y/3Y pipeline logic 218 that retains the instruction for stage 2Y. The updated instruction thereby becomes available for processing without again retrieving it from Memory 146.

Instead of these logic-intensive approaches of adding dedicated hardware to the Abort Logic 270 and associated circuitry, another approach leverages some of the existing functionality of Interrupt Logic 274 and Main Control Store Section 238 to address some conflicts. This can best be understood in reference to the logic diagram of FIG. 12.

Before continuing, it will be understood that the circuitry of FIG. 11 is merely one exemplary embodiment of an instruction processor architecture. Many alternative pipelined and non-pipelined instruction processor architectures may likewise usefully practice the current invention.

FIG. 12 is a logic block diagram of IP 134 illustrating the Main Control Store Logic 238 in more detail. Assume that instruction N described above is in stage 4X such that Operand Address Generation Logic 250 is generating an address that will overwrite an instruction within Memory 146. The instruction being modified happens to also be resident within the pipeline. This conflict situation must be addressed to prevent erroneous system operation. The conflict is detected by compare logic 300, which receives address values from operand address generate logic 250 on lines 302, and which also receives pipeline instruction addresses from all of the other pipeline stages on lines 304.

When this type of conflict is detected, an indication of the particular conflict is provided on line 301 to Interrupt Logic 274. In response, Interrupt Logic 274 provides an indication that an interrupt occurred on line 306. This signal is provided to all of the logic sections of the IP. This is the same signal provided to the logic sections during conventional interrupt processing.

When a logic section of the IP receives an interrupt indication, sequences are activated within all applicable logic sections to cause predetermined state bits to be stored within the respective staging registers. For instance, the signals on lines 306 cause Architectural State Block 260 to transfer Designator Bits 308 into Staging Registers 310. Likewise, the signals on lines 306 cause Instruction Decode Dispatch Logic 224 to store F0 register 312 into Staging Register 314, and so on. Depending on the embodiment, some, or all, of the logic sections shown in FIG. 11 have similar sequence logic that, when enabled, initiates the storing of state information into respective staging registers.

Activation of Interrupt Logic further causes Instruction Decode Dispatch Logic 224 to activate operation of Main Control Store Section 238 as follows. As noted above, during the normal instruction execution, Instruction Decode Dispatch Logic is driving decoded hardware signals on lines 226 that are selected by Select Logic 230 to be provided to the remaining sections of the IP on lines 232. Thus, Instruction Decode Dispatch Logic 224 is controlling execution of the IP during normal (standard-mode) instruction execution. However, after the indication of the interrupt is received by Instruction Decode Dispatch Logic 224, this logic may provide address signals on lines 242 to Select Circuit 316 to address Microcode RAM 318, thereby allowing Main Control Store Section 238 to assume control over the IP for interrupt processing. In particular, the address signals that are provided on lines 242 by Instruction Decode Dispatch Logic 224 are concatenated with an interrupt vector provided by Interrupt Logic 274 on lines 276. The concatenated signals form an address that are selected via Select Circuit 316 via Control Logic 320 and provided to Microcode RAM 318.

The address signals that are provided to Microcode RAM 318 are used to read microcode instructions for the specific type of interrupt that occurred, as indicated by the vector on lines 276. In the case of a conflict according to the current example, the vector on line 276 indicates that a conflict, rather than an interrupt, was detected. The interrupt handling microcode stored within microcode RAM 318 is therefore used in a non-conventional manner to handle this occurrence, as follows.

The first retrieved microcode instruction for the conflict is provided to Micro Sequencer 322 on lines 324. Micro Sequencer 322, which includes sequencer logic, is controller by the microcode instruction on lines 324 to generate signals on lines 326. These signals on lines 326 are selected by Select Circuit 230 and the activation of the CS control signal on line 234. In this manner, Micro Sequencer 322 provides signals to the other IP logic sections on lines 232.

In addition to providing the signals on lines 326, Micro Sequencer 322 further generates signals on lines 328, some of which are provided to Control Logic 320, and others of which are forwarded to Select Circuit 316. The signals on line 328 that are provided to Select Circuit 316 may be selected by Control Logic 320 as the next address provided to Microcode RAM 318. In this manner, the next microcode instruction of the conflict handler is retrieved for presentation to Micro Sequencer 322, and so on. Main Control Store Section 238 thereby assumes control over the IP.

During conventional (non-conflict) interrupt processing described above, the signals provided on lines 232 by Main Control Store Section 238 may cause the hardware state that had been saved in the staging registers to be transferred from their staging registers to Memory Interface 215. From there, the signals may be transferred to Memory 146 and stored as a Conflict ICS Packet for use by, for example, the operating system during interrupt processing. In contrast, during special processing for the conflict situations, the microcode routine generates slightly different signals that transfer the staged hardware state from the staging registers to Scratch Pad 330 of GRS 246. For instance, the designator bits of Architectural State Block 260 may be read from Staging Registers 310 onto special lines of interface 232 and are stored into Scratch Pad 330 of GRS 246. Similarly, activated signals on interface 232 may cause the staged F0 value in Staging Register 314 to be read onto interface 232 for transfer to Scratch Pad 330. In a like manner, all of the state information from the various other logic sections of FIG. 11 (some of which are not shown in FIG. 12 for ease of reference) are read from the respective staging registers for transfer into the Scratch Pad 330. In one embodiment, the saved information is formatted in the same manner as a Conflict ICS Packet that is created in Memory 146 during interrupt processing. This packet is shown as Conflict ICS Packet 332 within Scratch Pad 330.

In addition to transferring the staged state information to Scratch Pad 330, the microcode routine also generates signals on lines 232 to clear the appropriate stages of the pipeline. For some conflict processing, the instruction that was executing in the stage that detected the conflict is allowed to complete normally. All instructions following that instruction are flushed. The stages that contained the flushed instructions are set to an initialization value in a manner similar to the way these stages are cleared during interrupt processing.

After the microcode routine for the conflict situation completes the transfer of the staged state information to the Conflict ICS Packet within Scratch Pad 330 and clears the pipeline stages affected by the interrupt, the microcode routine executes a version of a User Return microcode that is executed during interrupt processing.

In some cases, during interrupt processing, an interrupt handler operating under the control of the operating system is executed to address the interrupt situation. The last instruction of this interrupt handler is generally a User Return instruction. This User Return instruction is an extended-mode instruction which executes for additional cycles 2E-NE, as shown in FIG. 10. These additional cycles operate under the control of Micro Sequencer 322 in the manner described above. During these extended cycles, the signals generated by Micro Sequencer 322 on interface 232 cause Operand Address Generation Section 250 to provide an address within Memory 146 at which the Conflict ICS Packet is stored, thereby initiating the retrieval of the hardware state that is stored within Memory 146 (FIG. 7). In addition, during some interrupt processing, Micro Sequencer provides signals on interface 232 to cause the hardware state that is retrieved from Memory 146 to be restored back to the appropriate storage devices of the IP logic sections. Finally, the PAR value that is retrieved from the Conflict ICS Packet within Memory 146 is provided to Instruction Address Generation Section 211 (FIG. 11). This address is used to retrieve the target instruction that resulted in generation of the interrupt so that processing can resume at the interrupted point.

During conflict processing, execution occurs in much the same way as that described above. However, instead of initiating the microcode for the User Return operation via a User Return instruction that enters the F0 register 312 and eventually activates Micro Sequencer 322, a copy of that User Return microcode is made for use during conflict processing. This copy of the microcode is modified slightly such that instead of causing Operand Address Generate Logic 250 to provide an address to Memory Interface 215 to initiate retrieval of the Conflict ICS Packet from Memory as is done during interrupt processing, the microcode provides signals on interface 232 to enable reading of the Conflict ICS Packet from Scratch Pad 330. The saved staged state from the Conflict ICS Packet is transferred to the appropriate storage devices of the various logic sections of the IP. For instance, the stored designator bits are read from the Conflict ICS Packet 332 and transferred via interface 262 to the storage device storing Designator Bits 308 within Architectural State Block 260. Similarly, the F0 value is transferred from Conflict ICS Packet 332 to F0 Register 312. Other similar transfer operations occur to the other logic sections of the IP to restore the IP state.

When the modified User Return microcode has finally restored the hardware state in the forgoing manner and transferred the PAR to Instruction Address Generation Section 211, the Micro Sequencer 322 generates a signal on interface 232 to cause Instruction Address Generation Section 211 (FIG. 11) to begin fetching an instruction from the PAR. The instruction that was executing in the pipeline stage that detected the conflict will then be re-fetched, thereby allowing the IP to resume processing of this instruction stream.

To summarize, when a conflict or other designated situation is detected, instead of handling this situation via dedicated hardware associated with Abort Logic 270, Interrupt Logic 274 is activated. A special vector associated with the conflict or other situation causes Micro Sequencer 322 to save the hardware state in GRS 246, flush the stages of the pipeline that are associated with the conflict, restore the hardware state, and resume execution with the target instruction. This is sufficient to resolve many conflict and other situations, as can be appreciated by returning to the foregoing example involving the self-modifying code.

Assume that an instruction N in stage 4X is modifying an instruction N+5 that has already entered the pipeline. This situation is detected by Compare Logic 300 such that a conflict signal is provided to Interrupt Logic 274 on line 301. This causes the state of the IP to be saved within Conflict ICS Packet 332, and also causes the pipeline stages after instruction N to be flushed and placed in an initialization state. Instruction N completes execution in a normal manner.

Because the pipeline stages are flushed for all instructions after instruction N, the outdated copy of instruction N+5 is cleared from the pipeline. When the User Return microcode is executed to restore the state, PAR will be set to instruction N+1 such that this is the first instruction that is re-fetched from memory so that execution may resume with the interrupted instruction stream. When the time comes to re-fetch instruction N+5, the modified copy of the instruction will either be located within I-FLC 138, SLC 142, or Memory 146, depending on whether store-through or store-in caches are utilized in the system. In any event, the updated copy of the instruction will be retrieved so that operation may continue.

There is a distinction between the mechanism used to resolve conflicts or other designated situations and that used to handle standard interrupts. During standard interrupt processing, control of the system is typically turned over to the operating system. Therefore, the operating system must be aware of each type of interrupt that is being handled. Special interrupt-handling code must be developed to address each of the situations. In general, this requires that the software developer have a fair amount of understanding regarding IP architecture. Moreover, the interrupt code must be tested, a process that may be quite involved. Thus, each time a new interrupt situation is identified for handling by the operating system, a significant amount of development and test time is required to ensure the resulting code will operate as desired.

In contrast to standard interrupt processing, and in some embodiments, the current mechanism for conflict or other designated situation management may not implicate the operating system. As discussed above, control of the system may never be turned over to the operating system, but instead may be maintained by the Micro Sequencer 322 within the IP. No new code need be developed or tested. Most hardware and microcode already exists and has been tested for other purposes, significantly reducing test time. Thus, this mechanism provides an attractive alternative for addressing some conflict and other situations.

Many different conflict situations may take advantage of the current mechanism. For instance, although the foregoing discussion deals primarily with the modification of instruction N+5 by an instruction N, it will be appreciated that this method may be used to resolve conflicts occurring when instruction N is modifying any instructions that follow it in the instruction stream and that are already resident in the pipeline. Moreover, many other types of conflicts may be handled by the current system and method.

Other types of special cases that may be handled using this approach include instruction combinations wherein an instruction N is modifying an operand utilized by an instruction N+1 such that the operand will not be available at the time instruction N+1 requires its use. Instead of adding logic intensive wrap-paths that add circuitry, that will increase power consumption of the device, and that must be tested, the current mechanism may be used to flush the pipeline following instruction N so that a delay is added between instructions N and N+1. By the time instruction N+1 re-enters the pipeline following execution of the conflict-handling microcode, the operand is available and execution may continue without error.

Another advantage to the above-described mechanism involves the fact that, if desired, a logic problem that resulted in detection of the conflict may be addressed within the system microcode. That is, instead of merely saving, then restoring, the IP state to clear some of the pipeline stages, additional microcode may be executed between the saving and restoring steps to take measures to address the conflict or other situation. This microcode may, for instance, analyze the type of conflict that occurred. If a predetermined conflict type is detected, execution may be diverted via a branch microcode instruction to a microcode routine that provides a "workaround" for the problem. In this way, design problems may be addressed in microcode without the need to modify the hardware. At the end of this additional microcode, a microcode branch instruction may be so that execution continues with the standard User Return microcode that restores the machine state in the previously-described manner.

Also, it is contemplated that additional microcode may be executed following detection of a conflict to store the Conflict ICS Packet, and/or other system information, to a cache or Memory 146. The microcode to accomplish this may be very similar to that utilized during standard interrupt processing. However, instead of turning control over to the operating system after this system information is saved, as would be the case if a standard interrupt were being processed, the User Return microcode is next executed so that execution continues with instruction N+1 of the previously-executing instruction stream. The information saved to Memory may describe the type of conflict that occurred.

This data that is saved to Memory 146 or a system cache in the foregoing manner may describe the types of instructions that were in the pipeline, as well as other information regarding the state of the IP, at the time the conflict occurred. A time stamp may also be included in this stored data. This information may be periodically collected manually by software developers or other professionals, or may be harvested automatically by a software program. This data may then be employed to analyze the types, and frequency, of conflict occurrences. Using this information, software, firmware, and/or microcode may be optimized to eliminate the situations that cause the conflicts so that at least some conflict occurrences may be entirely avoided.

Another example of using the above-described mechanism involves addressing parity errors, such as parity errors on an instruction that has already entered the pipeline. Rather than requiring the use of dedicated, logic-intensive abort hardware to flush that instruction from the pipeline as may be associated with Abort Logic 270, the current mechanism may employ compare logic to raise a conflict signal to Interrupt Logic 274. This may cause the flushing of the corrupted instruction, which will have already been invalidated within I-FLC 138 and SLC 142 when the error was detected. When the operation resumes with the instruction stream following execution of the conflict microcode, an uncorrupted copy of the instruction is retrieved from Memory 146 for re-entry into the pipeline and execution may continue without error.

In some cases, the control store memory (e.g. Microcode RAM 318 in FIG. 12) may itself produce a parity error. In some cases, the parity error may result from a soft error in the Microcode RAM 318 itself. A soft error can often be recovered from by simply reloading the desired data into the memory.

To detect a parity error in the Microcode RAM 318, a Parity Error Detector 340 is provided. In the illustrative embodiment, the Parity Error Detector 340 is adapted to detect a parity error on the output of the Microcode RAM 318, and report the parity error to Interrupt Logic 274.

In some cases, the detected parity error is treated like a conflict, as described above, and is recovered from without any interaction with the operation system. For example, the Main Control Store Section 238 may notify Interrupt Logic 274 of the detected parity error. The Interrupt Logic 274 may halt execution of instructions in the instruction pipeline, and notify a Maintenance Processor 342 of the detected parity error. In response, the Maintenance Processor 342 may reload at least part of the Microcode RAM 318, and in some cases, the entire contents of the Microcode RAM 318. This may be done without any interaction with the operating system of the data processing system.

The Interrupt Logic 274 may also provide an interrupt vector to the Main Control Store 238. Once the Microcode RAM 318 is reloaded, the Micro Sequencer 322 may cause Select Circuit 316 to select the interrupt vector. The interrupt vector may select microcode instructions from the Microcode RAM 318 that store the state of the various logic sections of the instruction processor, re-queue the instruction or instructions that corresponded to or would be affected by the detected parity error, and re-execute these instructions automatically. In some cases, the parity error is detected, the control store memory is reloaded, and the instruction or instructions that corresponded to or would be affected by the detected parity error is/are re-executed, without any interaction with the operating system of the pipelined instruction processor.

In some cases, if after a first parity error is detected in the Microcode RAM 318, and the control store memory is reloaded, and the instruction or instructions that corresponded or would be affected by the first detected parity error is/are re-executed, and then a subsequent parity error is detected for the same instruction or instructions, a critical error may be issued, and the pipelined instruction processor may be halted and the operating system may be notified.

It will be understood that the circuitry of FIG. 12 is merely one exemplary embodiment of a Micro Sequencer and other processor logic. Many alternative embodiments are possible within the scope of the current invention.

In the foregoing Description, various features may be grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A pipelined instruction processor having a number of pipelined stages, comprising:
   an instruction pipeline for processing instructions in a pipelined manner;
   a control store for controlling one or more operations of one or more instructions in the instruction pipeline, the control store including a control store memory;
   the control store including a parity error detector for detecting a parity error in the control store;
   a maintenance block for reloading at least part of the control store memory; and
   the control store includes a microcode engine that notifies the maintenance block to reload at least part of the control store memory if a parity error is detected by the parity error detector.

2. The pipelined instruction processor of claim 1, wherein the microcode engine is coupled to an output of the control store memory.

3. The pipelined instruction processor of claim 2 wherein the parity error detector causes a parity error interrupt for interrupting the pipelined instruction processor.

4. The pipelined instruction processor of claim 3, wherein the maintenance block includes a maintenance processor.

5. The pipelined instruction processor of claim 4, wherein the microcode engine notifies the maintenance processor of a parity error in the control store memory, and in response, the maintenance processor reloads at least part of the control store memory.

6. The pipelined instruction processor of claim 4 further comprising an interrupt logic block, wherein the parity error detector notifies the interrupt logic block of a detected parity error in the control store, and wherein the interrupt logic block provides the parity error interrupt for interrupting the pipelined instruction processor.

7. The pipelined instruction processor of claim 6 wherein the interrupt logic block notifies the maintenance processor of a parity error in the control store memory, and in response, the maintenance processor reloads at least part of the control store memory.

8. The pipelined instruction processor of claim 1 wherein the parity error detector detects parity errors in an output of the control store memory.

9. The pipelined instruction processor of claim 3 wherein the parity error interrupt causes the pipeline instruction processor to re-execute the instruction that corresponds to the detected parity error once the at least part of the control store memory is reloaded.

10. The pipelined instruction processor of claim 9 wherein the parity error is detected, the control store memory is reloaded, and the instruction that corresponds to the detected parity error is re-executed by the instruction pipeline without any required interaction with an operating system of the pipelined instruction processor.

11. The pipelined instruction processor of claim 10 wherein if a first parity error is detected, the control store memory is reloaded, and the instruction that corresponds to the detected parity error is re-executed by the instruction pipeline, and then another parity error is detected in the control store for the same instruction, a critical error is issued and the pipelined instruction processor is halted.

12. A pipelined instruction processor having a number of pipelined stages, comprising:
   a control store for controlling one or more operations of one or more instructions in the pipelined instruction processor, the control store including a microcode engine in communication with a control store memory, and a parity error detector for detecting a parity error in the control store memory;
   a maintenance processor for reloading at least part of the control store memory; and
   the microcode engine of the control store is configured to notify the maintenance block of a detected parity error in the control store memory, and in response, the maintenance block is configured to reload at least part of the control store memory.

13. The pipelined instruction processor of claim 12 wherein the parity error detector causes a parity error interrupt for interrupting the pipelined instruction processor.

14. The pipelined instruction processor of claim 13, wherein the microcode engine is notified of the parity error interrupt, and the microcode engine then notifies the maintenance processor of a parity error in the control store memory, and in response, the maintenance processor reloads at least part of the control store memory.

15. The pipelined instruction processor of claim 13 further comprising an interrupt logic block, wherein the parity error detector notifies the interrupt logic block of a detected parity error in the control store memory, and wherein the interrupt logic block provides the parity error interrupt for interrupting the pipelined instruction processor.

16. The pipelined instruction processor of claim 12 wherein the parity error detector detects parity errors in an output of the control store memory.

17. The pipelined instruction processor of claim 13 wherein the parity error interrupt causes the pipeline instruction processor to re-execute the instruction that corresponds to the detected parity error once the at least part of the control store memory is reloaded.

18. The pipelined instruction processor of claim 17 wherein the parity error is detected, the control store memory is reloaded, and the instruction that corresponds to the detected parity error is re-executed without any required interaction with an operating system of the pipelined instruction processor.

19. A method for operating a pipelined instruction processor having a number of pipelined stages and a control store for controlling one or more operations of one or more instructions in the number of pipelined stages, the control store having a control store memory coupled to a microcode engine, the method comprising the steps of:
   detecting a parity error in the control store memory and notifying the microcode engine of the detected parity error;
   in response to being notified of a detected parity error, the microcode engine notifying a maintenance block of the parity error; and
   upon being notified of the parity error, the maintenance block reloading at least part of the control store memory.

20. The method of claim 19 wherein the reloading step includes reloading the entire control store memory.

21. The method of claim 19 wherein the detecting step detects a parity error in an output of the control store memory.

22. The method of claim 19 further comprising the step of reporting a parity error interrupt when a parity error is detected, the parity error interrupt interrupting the pipelined instruction processor.

23. The method of claim 22 wherein, in response to the parity error interrupt, the pipeline instruction processor re-executes the instruction that corresponds to the detected parity error once the at least part of the control store memory is reloaded.

24. The method of claim 23, wherein when the parity error is detected, the control store memory is reloaded, and the instruction that corresponds to the detected parity error is re-executed without any required interaction with an operating system of the pipelined instruction processor.

25. The method of claim 24 wherein in response to a first parity error, the control store memory is reloaded, and the instruction that corresponds to the detected parity error is re-executed, and in response to a subsequent parity error for the same instruction, a critical error is issued and the pipelined instruction processor is halted.

* * * * *